US008234341B2

(12) United States Patent
Rothschild

(10) Patent No.: US 8,234,341 B2
(45) Date of Patent: Jul. 31, 2012

(54) SYSTEM AND METHOD FOR LINKING TERRESTRIAL MAIL OVER A NETWORK

(75) Inventor: Leigh M. Rothschild, Sunny Isles Beach, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 444 days.

(21) Appl. No.: 11/702,272

(22) Filed: Feb. 5, 2007

(65) Prior Publication Data
US 2008/0189368 A1     Aug. 7, 2008

(51) Int. Cl.
G06Q 40/00     (2006.01)
(52) U.S. Cl. ..................................... 709/206
(58) Field of Classification Search .......... 709/204–207, 709/217–219
See application file for complete search history.

(56) References Cited

U.S. PATENT DOCUMENTS

| | | | |
|---|---|---|---|
| 6,343,327 B2 * | 1/2002 | Daniels et al. ................ | 709/239 |
| 6,459,953 B1 * | 10/2002 | Connelly et al. .............. | 700/224 |
| 7,603,311 B1 * | 10/2009 | Yadav-Ranjan ................ | 705/39 |
| 2001/0027487 A1 * | 10/2001 | Ruping et al. ................ | 709/229 |
| 2001/0054010 A1 * | 12/2001 | Bernabeo et al. ............. | 705/26 |
| 2002/0143631 A1 * | 10/2002 | Hasegawa ...................... | 705/14 |
| 2003/0233321 A1 * | 12/2003 | Scolini et al. ................. | 705/40 |
| 2004/0215480 A1 * | 10/2004 | Kadaba ........................... | 705/1 |
| 2007/0137073 A1 * | 6/2007 | Vinocur ..................... | 40/124.11 |

* cited by examiner

*Primary Examiner* — Ian N Moore
*Assistant Examiner* — Thai Nguyen
(74) *Attorney, Agent, or Firm* — Atanu Das; DaVinci IP

(57) ABSTRACT

A system and method for linking terrestrial mail to the global computer network, e.g., the Internet, are provided. The system and method of the present disclosure will enable a user, e.g., a sender and/or recipient of a document, to link all types of terrestrial mail to the global computer network, e.g., the Internet, so that they can digitally access, reply and/or utilize the content of the mail. The system and method provides for receiving an identifier associated with a terrestrial document; accessing an electronic version of the terrestrial document using the received identifier; creating a reply to the accessed document; and forwarding the reply to a sender of the terrestrial document. The reply document can be forwarded by e-mailing the reply to the sender, faxing the reply to the sender and/or printing the reply and delivering the printed reply by a terrestrial delivery service.

49 Claims, 4 Drawing Sheets

SYSTEM AND METHOD FOR LINKING TERRESTRIAL MAIL OVER A NETWORK

BACKGROUND

1. Field

The present disclosure relates generally to data processing and communication systems, and more particularly, to a system and method of linking terrestrial mail to the global computer network, e.g., the Internet, and for replying to the terrestrial mail, previewing the terrestrial mail, and digitally utilizing the terrestrial mail.

2. Description of the Related Art

Ten of billions of pieces of terrestrial mail arrive yearly to recipients. The mail comes in many forms including but not limited to general correspondence, billing statements, invoices for payments, brochures and catalogs, coupon offers, and greeting cards among others. Generally, terrestrial mail is delivered through various services such as the United States Postal Service and premium services such as UPS™, FEDEX™ and DHL™ to name a few. Delivery of such terrestrial mail is dependent upon many factors including weather conditions, manpower at the delivery service, etc. which effect the speed of delivery.

Many if not most of these mail recipients have Internet access. No way currently exists to link the articles of terrestrial mail to the Internet so that the recipient can easily reply to or utilize the content contained in the originally sent mail.

Therefore, a need exists for techniques to allow a user, e.g., a sender or recipient of terrestrial mail, to link the terrestrial mail to a remote server accessible over the Internet so subsequent recipients can easily and quickly reply to the terrestrially received mail.

SUMMARY

A system and method for linking terrestrial mail to the global computer network, e.g., the Internet, are provided. The system and method of the present disclosure will enable a user, e.g., a sender and/or recipient of a document, to link all types of terrestrial mail to the global computer network, e.g., the Internet, so that the user can digitally access, reply and/or utilize the content of the mail.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for linking terrestrial mail to the global computer network, e.g., the Internet, are provided. The system and method of the present disclosure will enable a user, e.g., a sender and/or recipient of a document, to link all types of terrestrial mail to the global computer network, e.g., the Internet, so that the user can digitally access, reply and/or utilize the content of the mail.

Figure 1:
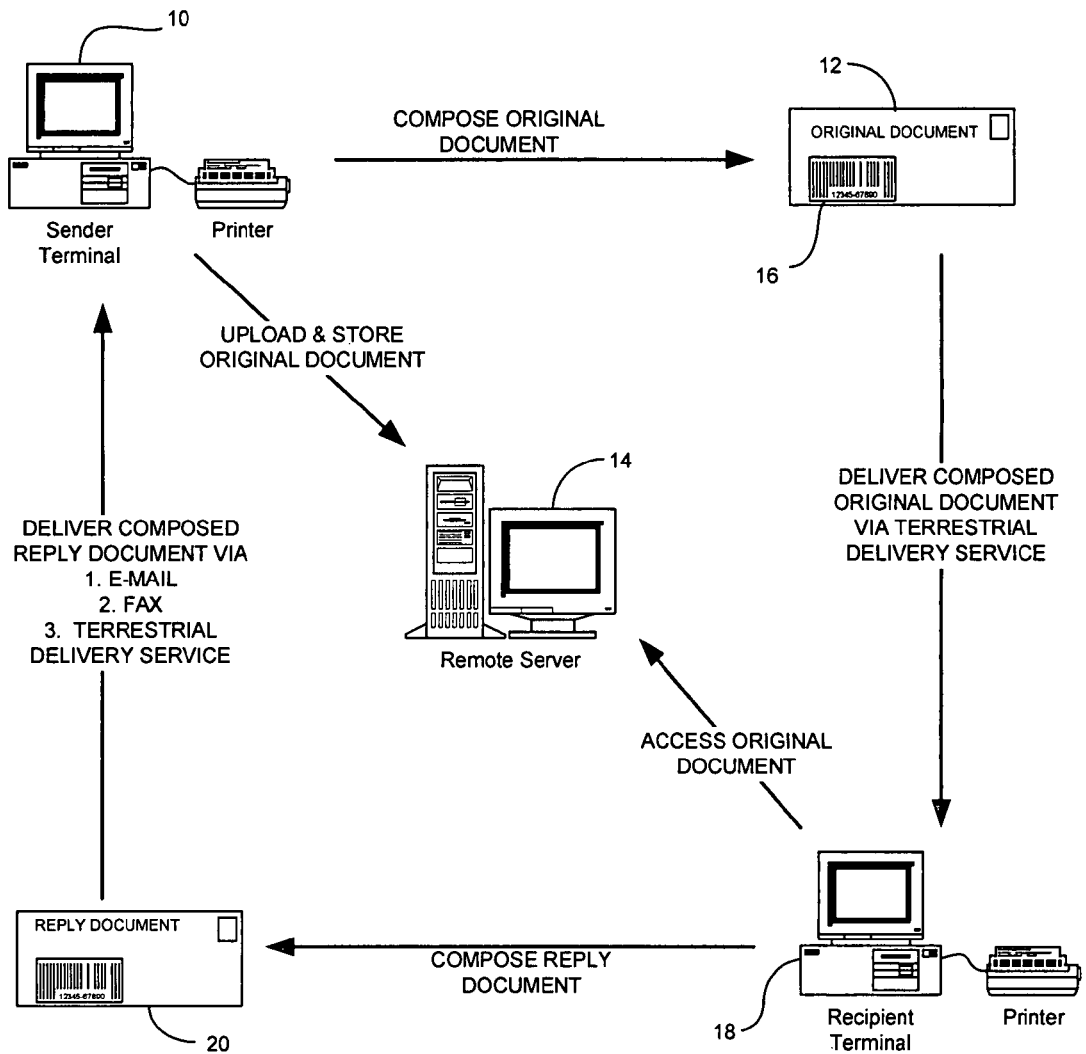
FIG. 1 is an overall flow diagram of a system and method for linking terrestrial mail over a network in accordance with an embodiment of the present disclosure.

Referring to FIG. 1, an overall flow diagram of the system and method of the present disclosure is illustrated. Generally, a sender 10 of terrestrial mail composes an original document 12 either on a local terminal or while accessing a remote server 14 coupled over a network to the sender terminal 10. Once the document 12 is composed, the remote server 14 will generate an identification code to be affixed to the original document. It is to be appreciated the identification code may be placed on the document, e.g., a letter, or on an envelope containing the original document. The original document 12 will be stored on the remote server 14 along with an identifier, e.g., the recipient's name or other code relating to the identity of the intended recipient, and the identification code in a database. The original document is then delivered to the recipient 18 via a terrestrial delivery service. The recipient 18 can then access the original document 12 as stored on the remote server 14 via the recipient's terminal 18. Once connected to the remote server 14, the recipient 18 will enter the identifier and identification code to gain access to an electronic version of the original document. The recipient 18 then can compose a reply document 20, optionally using content from the original document. Once the reply document 20 is completed, the recipient 18 will forward the reply document to the sender via e-mail, fax or a terrestrial delivery service.

Figure 2:
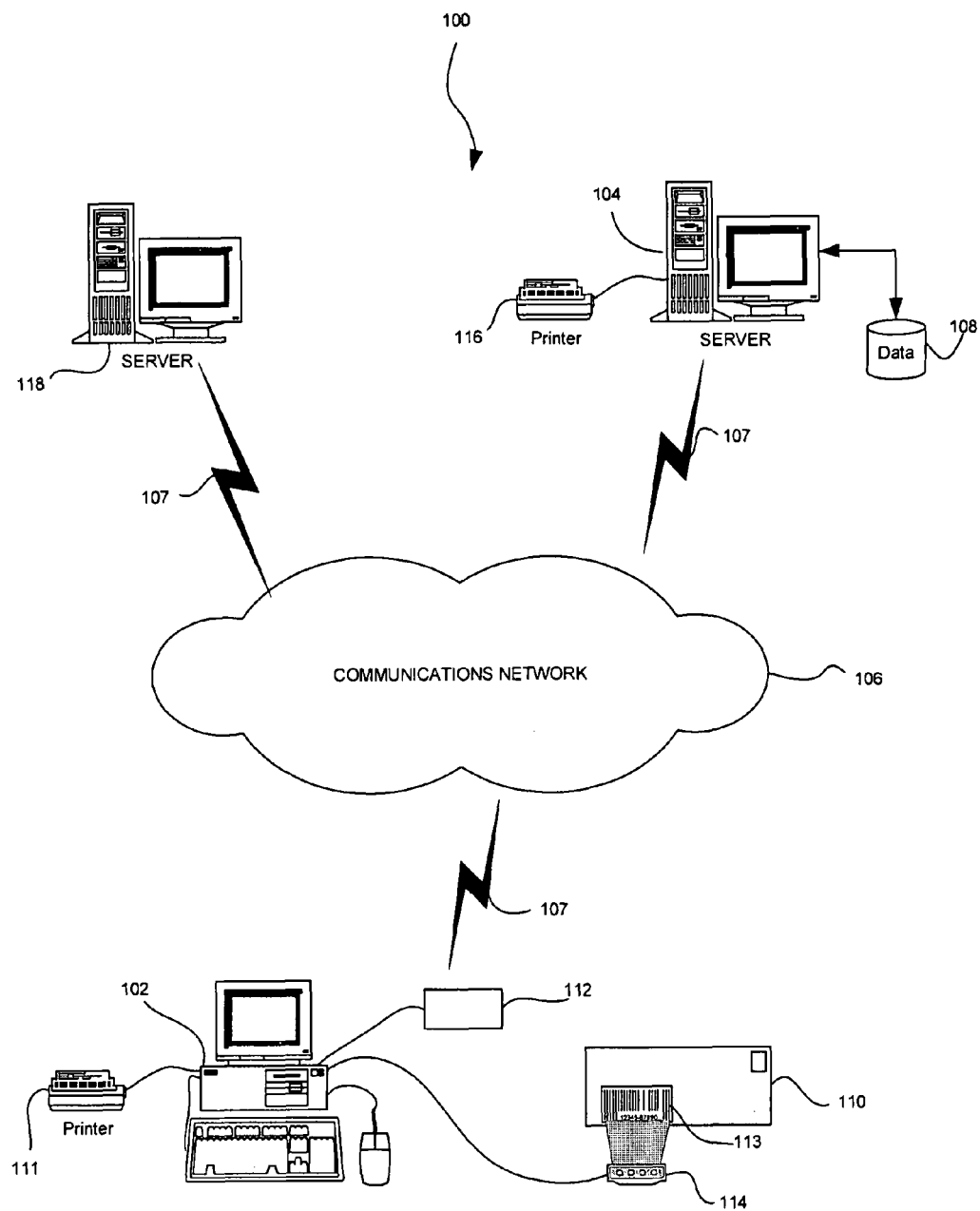
FIG. 2 is a diagram of a system for linking terrestrial mail over a network in accordance with an embodiment of the present disclosure.

Referring to FIG. 2, a system 100 for linking terrestrial mail to the global computer network is illustrated. The system 100 includes a terminal 102, e.g., a user computer, for accessing a server 104 over a communications network 106, e.g., the Internet. The terminal 102 and server 104 will communicate using any conventional architecture, for example a client/server architecture where the terminal 102 will execute a client application, e.g., a web browser, to access an application executing on the server 104. The terminal 102 will access the server 104 to enable a user to receive an identification code for a document as will be described below. The server 104 will generate the identification code for the document and will store an electronic version of the document in a database 108. The server 104 will transmit the document with the identification code affixed to the document to the terminal 102 so a user can print the document and forward the document to an intended recipient via conventional terrestrial delivery methods. The terminal 102 will include a communication module 112 for communicating to the remote server 104.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine, e.g., terminal 102 or server 104, comprising any suitable architecture such as a personal computer, a workstation or server. Preferably, the machine is implemented on a computer platform having hardware such as one or more central processing units (CPU), a random access memory (RAM), a read only memory (ROM) and input/output (I/O) interface(s) such as a keyboard, cursor control device (e.g., a mouse or joystick) and display device. A system bus couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof which is executed via the operating system.

In addition, various other peripheral devices may be connected to the computer platform of the machine by various interfaces and bus structures, such a parallel port, serial port or universal serial bus (USB). One such peripheral device may include a communications device, e.g., a modem, satellite relay, wireless connection, etc., for enabling communications from the terminal 102 to various servers. Other peripheral devices may include additional storage devices, a printer 111 and a scanner 114.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The terminal 102 and/or server 104 may operate in a networked environment using logical connections to one or more remote computers. The remote computer may be a personal computer, a server, a router, a network PC, a peer device or other common network node, and typically includes many or all of the elements described above relative to the machine. It is to be appreciated that the network 106 may be a local area network (LAN), wide area network (WAN), the Internet or any known network that couples a plurality of computers to enable various modes of communication via network messages. The terminal 102 may communicate to the server 104 and network 106 via any known communication link 107, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 3:
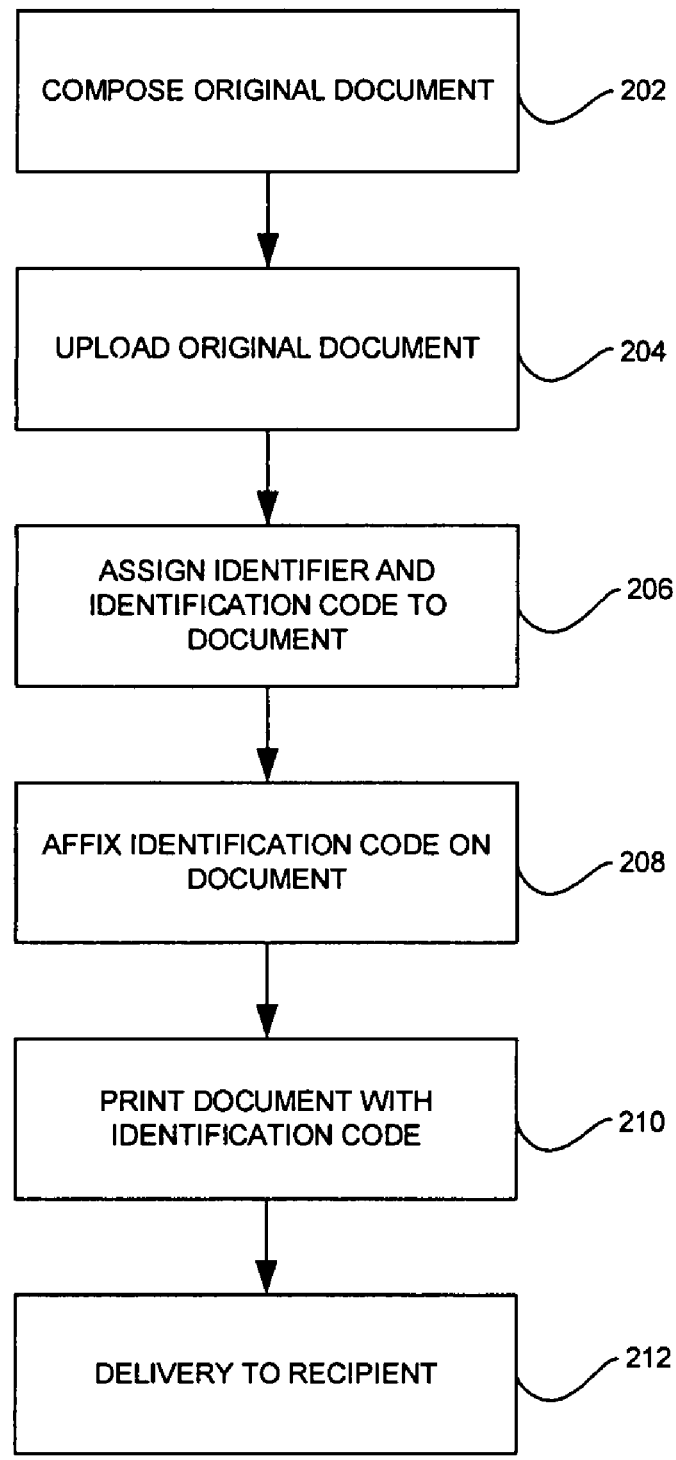
FIG. 3 is a flow chart illustrating a method for creating and storing a terrestrial document in accordance with an embodiment of the present disclosure.
Figure 4:
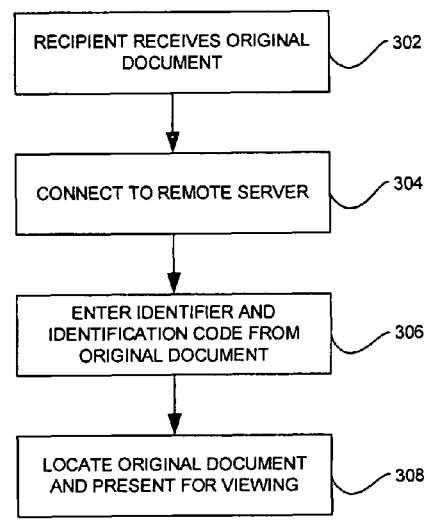
FIG. 4 is a flow chart illustrating a method for accessing an electronic version of a terrestrial document in accordance with an embodiment of the present disclosure.
Figure 5:
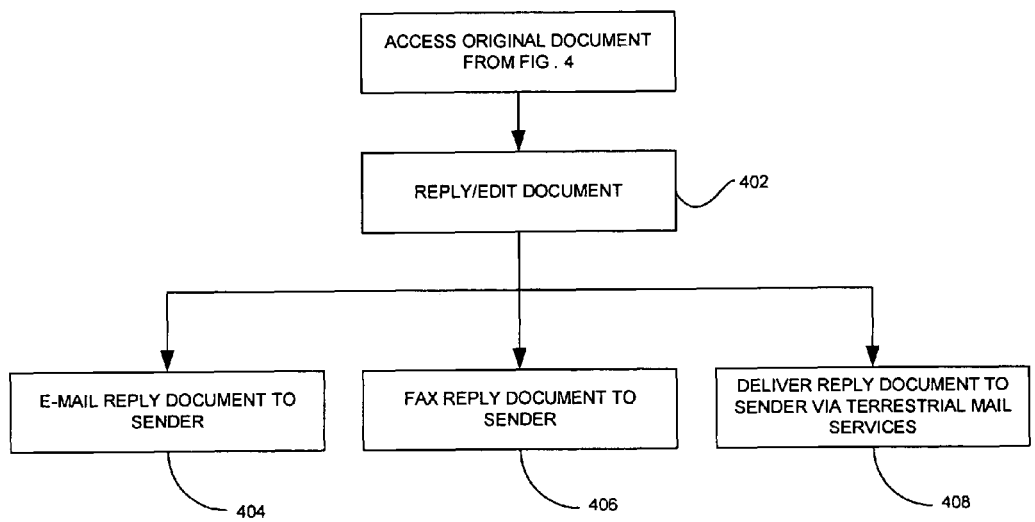
FIG. 5 is a flow chart illustrating a method for replying to a terrestrial document over a network in accordance with an embodiment of the present disclosure.

With reference to FIGURES, a system and method of the present disclosure will now be described, where FIG. 3 illustrates a method for creating and storing a terrestrial document, FIG. 4 illustrates a method for accessing an electronic version of a terrestrial document and FIG. 5 illustrates a method for replying to a terrestrial document over a network.

Initially, a user, e.g., a sender of a terrestrial document, creates and stores a terrestrial document on the global computer network, e.g., the Internet. In step 202, a sender composes a document. It is to be appreciated the document can include but is not limited to a letter, financial statement, brochure, invoice, catalog, coupon offer, etc. The sender will compose the document using any composition program herein known or known in the future including but not limited to Microsoft Word™, Corel's WordPerfect™, Adobe Photoshop™ or Creative Suite™ or Acrobat™, Microsoft Excel™, Lotus SmartSuite™, etc. The document is then uploaded from the local terminal 102 to the remote server 104, in step 204. Alternatively, the sender, or user, can compose the document on the remote server 104 and save the document on the remote server using the remote server's computer processing power. The user will also indicate the user's identity (e.g., the sender's e-mail address or any other unique identification) so that the remote server knows the identity of the originator of the document, i.e., the sender of the document. In another embodiment of the present disclosure, the user can also indicate an addressee of the document, e.g., an intended recipient, by entering the addressee's name, residence address, e-mail address and/or fax number. While entering the addressee's information, the sender can also indicate that the addressee should be sent a preview of the terrestrial document by e-mail or fax. Any other notations regarding the created terrestrial document such as how to file the document (for example, by category, subject matter, file number, etc.) can also be communicated to the remote server 104. All of the information on the document will be stored in a standard database program such as Oracle's Database™, Microsoft Access™, etc. using standard database storage protocols on storage medium 108.

Once the document is saved on the remote server database 108, the server 104 will assign an identification code to the document, in step 206. This identification code will be used in conjunction with an identifier of the recipient as the login/password set for future access to the document. The identifier such as the recipient's name on the document is used as the login entry. This identifier will be something that is obvious to the recipient of the document, except in the case of a 'secure' document where the sender will inform the server 104 to not specify a login since the sender has told the recipient the login information, e.g., by word of mouth, e-mail, etc. The remote server 104 will then assign an identification code for this individual document. Each document will have its own identification code. In one embodiment, the identification code will be an alpha-numeric string consisting of at least nine digits and presented in the form of an area code phone number. A sample code would be A9C-RT1-09HG. This alpha-numeric code would allow the remote server 104 to assign more then a thousand trillion identification codes. The remote server 104 will assign these numbers at random so that no documents fall in a number sequence, to prevent guessing code sequences and 'hacking' into the documents database. The identification code once assigned may be converted to any form of symbology currently know including barcodes such as UPC, EAN, PDF417, etc., photosymbols, standard or specialized text, etc., or any future type of symbology. Once assigned the alpha-numeric string or symbology representing the alpha string will be printed onto the document either as a visible watermark, a digital watermark, or both, such that the recipient of the document can easily read the symbology or that a machine (e.g., a scanner or other type of device) can read the identification code. It is to be appreciated that, in certain embodiments, the identifier and identification code can be used to create a single symbology and/or alpha-numeric code which will simplify enter of this information.

The sender will then receive via download or other form of communication between the remote server 104 and the sender's terminal 102 the document with the identification code affixed. The document 110 can then be printed by the sender with the identification code 113 (step 210) and delivered via conventional delivery services including Federal Express, US Postal Service, UPS, DHL, etc. to the recipient (step 212). If the user is creating the document on the remote server 104, the server 104 can store and print the document via printer 116.

The present disclosure contemplates the use of any known or to be developed document composition programs such as Microsoft Word™, Corel WordPerfect™, Adobe Photoshop™, and other programs. The present disclosure also contemplates adding a plug-in control to a sender's or user's software applications residing on a local terminal (whether the plug-in is supplied by the software publisher or supplied by a third party provider). The plug-in control will allow the documents that are created with these various composition programs on the local terminal to be stored, data based, and the symbology/alpha-numeric strings added to the final document without the user having to manually upload and download the document to the remote server. The plug-in control will seamlessly interact with the remote server and cause an identification code to be generated and the final version of the document to be stored on the remote server in addition to being stored on the local terminal. Once loaded at a local terminal, the plug-in may appear as a button in a toolbar of the document composition program or may appear as a additional and separate toolbar. In this manner, after the document has been created, the user will simply select, or click on, the appropriate button or toolbar with a cursor control device and the local terminal will interact with the remote server and an identification code will be generated for the document as described herein. It is to be appreciated that other software applications, e.g., an applet, may reside on the local terminal which will perform the same functionality as the plug-in.

Once the document has been created and stored, the document 110 is sent to at least one recipient. The intended recipient will receive the terrestrial mail article 110 (step 302) and connect to a remote site residing on remote server 104 (step 304). Although not shown in FIG. 2 as two separate terminals, the sender and/or recipient will employ a terminal similar to terminal 102 and having similar functionality. In step 306, the recipient enters the identifier from the received correspondence. The recipient may enter the information manually via the keyboard, voice recognition, etc. or by scanning the identifier via scanning device 114. The identifier may be the recipient's name on correspondence or any other identifier. The identifier will function as the login name for the website residing on the remote server 104. The recipient will then enter the identification code 113 printed on the correspondence 110. The identification code 113 will act as the password for the website. The identification code 113 may be an alpha-numeric string or any other form of symbology currently known (including barcodes, etc). In the case of an alpha-numeric string, the preferred embodiment will be a 9 digit alpha-numeric string which allow the website to assign more then a trillion codes for documents.

In another embodiment, the recipient may also scan in the document using standard photo scanning or OCR software such as Omni Scan or Kodak Scanning software and the local terminal will use standard computer processing power to read and decode the symbology or alpha-numeric string and store that string in memory and then use standard communications protocols to transmit that decoded string to the remote server site. Alternatively, the recipient may employ a barcode scanner to read the printed symbology from the document.

Once entered, the login and password will cause the remote server 104 to access standard database software including Microsoft Access™, Oracle™ Software, etc., and, by associating the alpha-numeric string with the database and using standard computer processing power, to locate the requested document and then allow the recipient to view that document on his local terminal 102 (step 308). In one embodiment of the present disclosure, the recipient may also indicate the user's account login and password and then the remote server will locate all documents that are associated with the user's identity. These documents may be sorted by content, document category, document name, recipient's name, document date, or any other user defined parameters. If the user accesses their account, the subject document, i.e., the newly received document, will then be added into the database of the user stored and accessible documents.

Once the document is accessed and available on the remote server, the recipient can reply to the document (step 402). In one embodiment, the recipient may reply by requesting that the remote server transfer the document (e.g., download) to the recipient's local terminal. In another embodiment of the present disclosure, the recipient could also edit/revise the document using the processing power of the remote server 104 and then the remote server could either download the document to the recipient's local terminal 102, or alternatively, send the document from the remote server and store the document at the remote server. In either case, the recipient can reply to the sender in the following ways:

1. E-mail the reply document to a designated addressee (step 404). The sender's e-mail address can be automatically inserted into the outgoing e-mail if the original document contained such information. The recipient can insert the original document as an attachment to the outgoing e-mail, or insert any of the content from the original document in the outgoing e-mail. The recipient can compose the reply on pre-stored digital letterhead and, when the document is ready to be sent, the reply document can be saved as an image of the document, or as a digital text file that can be read by any conventional word processing program including Microsoft Word™, Corel WordPerfect™, etc.

2. Reply by fax (step 406). The recipient can send the reply document using any number of popular Internet fax programs such as eFax™ commercially available from j2 Global Communications of Hollywood, Calif. The sender's fax number can be automatically inserted into the outgoing fax if the original document contained such information. The recipient can insert the original document as an attachment to the outgoing fax, or insert any of the content from the original document in the outgoing fax. The recipient can compose the reply on pre-stored digital letterhead and when the document is ready to be sent, the document can be saved as an image of the document, or as a digital text file that can be read by any conventional word processing program including Microsoft Word™, Corel WordPerfect™, etc.

3. Reply using terrestrial mail services (step 408). Initially, the recipient selects a pre-stored electronic letterhead. The recipient composes his document and the sender's terrestrial address can be automatically inserted into the outgoing document if the original document contained such information. Further, the recipient may insert any of the content from the original document in the outgoing reply document. The recipient can then sign the document with an electronic signature using common word processing signature software (including Microsoft Word™). The recipient will then contact the remote server 104 on the network 106 and transmit the document (upload) to the remote server 104. Alternatively, if the recipient chooses to compose the document on the remote server as discussed above the recipient can save and store the document on the remote server 104. Once stored, the remote server will retransmit the document to the printer 116 where the document will be printed and inserted into an envelope that contains address information supplied by the recipient and then the document will be mailed to the addressee. This service is ideal for mail facilities to utilize (such as the US Postal Service) to allow their customers to digitally answer terrestrial mail.

If the recipient requests, the remote server can direct an e-mail to the intended addressee to inform the addressee that the document has been sent and can include a 'preview' copy attached of the document that was sent.

The present disclosure will enable at least the following applications of the systems and methods described herein.

A recipient receives a terrestrial letter. The recipient wishes to reply to the letter. The recipient accesses a web site on a remote server on the global computer network, e.g., the Internet, and types in an identifier (e.g., the recipient's name) and an identification code string printed on the letter. Instantly, the letter appears with both an image of the letter (if an image was stored) and the content of the letter that is accessible from the recipient's word processing program. The recipient can now reply to the letter by standard e-mail and can add the original letter as an attachment to the e-mail, or the user can utilize all or some of the content of the original letter in his e-mail. If the sender of the original letter indicated his e-mail address, then the recipient will automatically be provided this information. Further, the recipient can reply to the letter by fax, (again with the original letter as a fax attachment and the sender's fax information automatically included if available). Furthermore, the recipient can pick digital letterhead and compose a letter to the sender of the original letter, electronically sign the letter, and ask the letter to be printed and terrestrially delivered from a remote location. In all cases (if the information was supplied), the recipient will automatically be able to add the sender's address and name and, if applicable, e-mail or fax number to the letter. In one embodiment, the letter can be a greeting card and the recipient can create and forward a reply greeting card to the sender.

A recipient receives a bank or financial statement. The recipient accesses a web site on the Internet and indicates the recipient's name (or other login information) and the symbology/code string printed on the letter. The statement then is accessed and appears on the display of the recipient's computer. The recipient is now enabled to reply to the statement via a customer service e-mail address or any other address of the sender's choosing. Additionally, the recipient can download the information contained in the statement to any financial software program including but not limited to Microsoft Money™, Quicken™, etc. or spreadsheet program including but not limited to Microsoft Excel™, IBM Lotus™, etc. Further, if the recipient wishes to login to the statement's web site then the recipient will be provided a link for this purpose, from which they will be redirected to the appropriate web site. At this site, after clearing password access, the recipient can access the sender's web site and obtain further information on the recipient's account. Additionally, the recipient can pick out digital letterhead and compose a letter to the sender of the original letter, electronically sign the letter, and ask the letter to be printed and terrestrially delivered from a remote location.

A user receives a letter and views the letter on the global computer network by accessing a web site and typing in the login identifier (e.g., the recipient's name or other login information) and code printed on the letter, e.g., the identification code. The recipient replies to the letter by terrestrial mail and saves the reply onto the same web site on the remote server. The recipient may then direct the website to notify the intended recipient, e.g., the original sender, of the reply that a letter has been sent and is in transit but that the recipient e.g., the original sender, may preview the letter by accessing the web site and supplying the login codes/password to allow the recipient e.g., the original sender, to view the reply. This will allow the recipient to have a paper copy of the letter delivered (perhaps for legal reasons or for other reasons the recipient wants a paper trail), and yet to have the recipient view the letter without waiting for the normal transit time of the correspondence.

A recipient receives a terrestrial document which is in fact an invoice. The recipient accesses the remote site on the global computer network, e.g., the Internet, and supplies the access login/codes information to view this invoice online. The recipient then is supplied a link to various financial services (e.g., payment service servers 118) including credit card processors, or financial agents such as Paypal™, etc. to allow the recipient to pay the invoice instantly. If the recipient does pay this invoice, a record of the payment and date of payment can automatically be provided by the web site to the recipient's financial information service or program such Quicken™ or Microsoft Money™.

In a further embodiment, a recipient receives promotional terrestrial mail such as a brochure or coupon offer. In this embodiment, the recipient will enter the appropriate login/codes to view the brochure/coupon offer online. The recipient will then be provided a link to access a related web site where the recipient can conduct a purchase transaction.

A recipient receives a terrestrial letter from a sender. The recipient wants to see what other letters from this sender he has on file. The recipient goes to the global computer network and accesses a remote web site. At the web site, the recipient supplies the access login/codes information needed to view the recipient's account at the web site. Once logged in the recipient can view all stored correspondence related to the current correspondence. Additionally, the recipient can use various search parameters to sort through previous correspondence by date of correspondence, sender's name, sender's address, subject matter, sender's e-mail or fax number, word search of all correspondence content, category of correspondence, etc.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for replying to terrestrial mail over a computer network, the method comprising the steps:

receiving a printed version of an original document that is a content enclosed in a package delivered by a terrestrial delivery service from a sender, the original document including original content and an identifier, the original content provided by the sender and the identifier provided by a remote server to the sender affixed to the printed version of the original document;

connecting to a remote site via a recipient terminal coupled to the computer network, the remote site residing on the remote server coupled to the computer network;

entering the identifier associated with the original document via the recipient terminal; and accessing an electronic version of the original document stored on the remote server using the identifier, wherein the electronic version of the original document includes the original content of the original document in electronically revisable form;

creating a reply to the original document using the recipient terminal, wherein the reply includes at least a portion of the original content from the original document; and forwarding the reply to the sender of the original document wherein the forwarding step includes sending an e-mail message as the reply to the sender and having the electronic version of the original document as an attachment to the e-mail message.

2. The method as in claim 1, wherein the forwarding step includes faxing the reply to the sender.

3. The method as in claim 1, wherein the forwarding step includes printing the reply and delivering the printed reply by a terrestrial delivery service.

4. The method as in claim 1, wherein the original document is a letter, a financial statement, a greeting card, an invoice, a brochure or a coupon offer.

5. The method as in claim 1, wherein the identifier is a symbology or alpha-numeric string on the original document.

6. The method as in claim 1, wherein the identifier includes an identity of an intended recipient.

7. The method as in claim 6, wherein the identity is the intended recipient's name.

8. The method as in claim 1, wherein the original document is a financial statement, further comprising the step downloading the financial statement to the recipient terminal.

9. The method as in claim 1, wherein the original document is a first greeting card, further comprising the steps creating a reply greeting card and forwarding the reply greeting card using the recipient terminal to the sender of the first greeting card.

10. The method as in claim 1, wherein the original document is an invoice, further comprising the step accessing a payment service provider to affect payment of the invoice.

11. The method as in claim 10, further comprising downloading the payment information to the recipient terminal.

12. The method as in claim 1, wherein the original document is a brochure is a brochure, further comprising the step accessing a related information website.

13. The method as in claim 1, wherein the original document is a coupon offer, further comprising the steps accessing a web site for conducting a transaction.

14. The method as in claim 1, further comprising the steps:
composing the original document;
creating an identifier for the original document; and
affixing the identifier on the original document.

15. The method as in claim 14, wherein the identifier includes and identity of a recipient and an identification code of the original document.

16. The method as in claim 15, wherein the identifier is encoded as a symbology or alpha-numeric string.

17. The method as in claim 15, further comprising storing at least one second document.

18. The method as in claim 17, further comprising associating the original document and at least one second document with the identity of the recipient in a database on the remote server.

19. The method as in claim 18, further comprising sorting the original document and at least one second document by a user-defined parameters.

20. The method as in claim 19, wherein the user-defined parameters are content, document category, document name, recipient's name or document date.

21. The method as in claim 14, wherein the identifier is positioned on the original document as a watermark.

22. The method as in claim 14, further comprising forwarding a preview of the original document to an intended recipient.

23. The method as in claim 22, wherein the preview of the original document is an image, text file or spreadsheet.

24. The method as in claim 14, further comprising associating information relating to an intended recipient with the original document and storing the associating information in a database.

25. The method as in claim 24, wherein the associated information includes the recipient's name, recipient's address, recipient's email address, recipient's fax number and category of the original document.

26. The method as in claim 1, wherein the entering step includes scanning the identifier from the original document.

27. A system for replying to terrestrial mail over a network comprising:
at least one first terminal configured for composing an original document containing original content wherein the original document is content enclosed in a package;
a remote server configured for creating an identifier for the original document, sending the identifier to the at least one first terminal affixing the identifier to the original document and storing an electronic version of the original document;
the at least one first terminal further configured for printing a printed version of the original document including the identifier affixed thereon;
at least one second terminal configured for transmitting the identifier read from the printed version of the original document including the identifier affixed thereon;
at least one second terminal configured for transmitting the identifier read from the printed version of the original document to the remote server and accessing the electronic version of the original document, wherein the electronic version of the original document includes the content of the original document in electronically revisable form; and
communications network for coupling the at least one first terminal, the remote server and the at least one second terminal;
wherein the at least one second terminal is further configured for creating a reply to the original document and forwarding the reply to a sender of the original document, such that the reply is an e-mail message having the electronic version of the original document as an attachment.

28. The system as in claim 27, wherein the at least one second terminal is configured for faxing the reply to the sender.

29. The system as in claim 27, wherein the at least one second terminal is configured for printing the reply and the printed reply is delivered by a terrestrial delivery service.

30. The system as in claim 27, wherein the original document is a letter, a financial statement, a greeting card, an invoice, a brochure or a coupon offer.

31. The system as in claim 27, wherein the identifier is a symbology or alpha-numeric string on the original document.

32. The system as in claim 27, wherein the identifier includes an identity of an intended recipient.

33. The system as in claim 27, wherein the identity is the intended recipient's name.

34. The system as in claim 27, wherein the identifier includes an identity of a recipient and an identification code of the original document.

35. The system as in claim 27, wherein the identifier is positioned on the original document as a watermark.

36. The system as in claim 27, wherein the remote server is further configured for storing at least one second document.

37. The system as in claim 36, wherein the remote server is further configured for associating the original document and at least one second document with the identity of the recipient in a database.

38. The system as in claim 37, wherein the remote server is further configured for sorting the original document and at least one second document by user-defined parameters.

39. The system as in claim 38, wherein the user-defined parameters are content, document category, document name, recipient's name or document date.

40. The system as in claim 27, wherein the remote server is further configured for forwarding a preview of the original document to an intended recipient.

41. The system as in claim 27, wherein the remote server is further configured for forwarding a preview of the reply to the sender of the original document.

42. The system as in claim 27, wherein the remote server is further configured for associating information relating to an intended recipient with the original document and storing the associated information in a database.

43. The system as in claim 42, wherein the associated information includes the recipient's name recipient's address, recipient's e-mail address, recipient's fax number and category of the original document.

44. The system as in claim 27, wherein the at least one second terminal further comprises a scanning device configured for scanning the identifier from the original document.

45. The system as in claim 27, wherein the at least one first and second terminals include a software application configured for interacting with the remote server to generate the identifier, for receiving the identifier from the remote server and for affixing the identifier to the original document or reply.

46. The system as in claim 45, wherein the software application is configured to transmit to the remote server the original document or reply with the identifier affixed.

47. The system as in claim 45, wherein the software application is a pug-in.

48. The system as in claim 27, wherein the at least one first and second terminals include a document composition program for composing the original document or reply.

49. The system as in claim 48, wherein the document composition program includes a plug-in configured for interacting with the remote server to generate the identifier, for receiving the identifier from the remote server and for affixing the identifier to the original document or reply.

\* \* \* \* \*